United States Patent Office 2,979,522
Patented Apr. 11, 1961

2,979,522

DIALKYL NITROALKYL DITHIOPHOSPHATES

James D. Johnston, Baton Rouge, La., and Lloyd E. Goddard, Detroit, Mich., assignors, by mesne assignments, to Pittsburgh Coke and Chemical Company, a corporation of Pennsylvania No Drawing. Filed Dec. 30, 1954, Ser. No. 478,904

11 Claims. (Cl. 260—461)

This invention relates to new compositions of matter and more particularly to a potent new class of organic insecticides.

An object of this invention is to provide new compositions of matter. A further object is to provide a new class of insecticides. Still another object is to provide a new means of combating insects.

The above and other objects are accomplished by the provision of a new class of compounds which comprises O,O-dialkyl-S-nitroaliphatic dithiophosphates. These are compounds of the formula

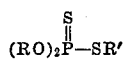

where R is an alkyl group, preferably of 1 to 8 carbon atoms, most preferably ethyl, and R' is a nitroaliphatic group, preferably of 3 to 10 carbon atoms. This nitroaliphatic group need not be nitroalkyl but can be an alkyl group substituted with hydrocarbonaceous or other radicals. One group of preferred compounds of this invention are those in which the nitroaliphatic group contains one nitro and one phenyl radical attached thereto.

We have found that this class of compounds, which, as can be seen from the above formula, contains 2 alkyl groups attached to phosphorus through oxygen and one nitroaliphatic group attached to phosphorus through sulfur, are extremely potent as insecticides and, in the case of certain members of the series, possess extreme effectiveness against a wide gamut of insects. Moreover, some of the materials are even active fungicidally. Thus, a means for combating insects is provided which comprises treating the habitat of the insects with a compound of this invention.

One method of preparing our new compounds is by reaction of an O,O-dialkyl dithiophosphoric acid,

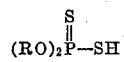

and an unsaturated aliphatic nitro compound, preferably a nitroolefin. Reaction takes place by addition of the acid to the double bond of the nitro compound, with the sulfhydryl hydrogen adding to one of the doubly bonded carbon atoms and the remainder of the molecule adding to the other. Depending upon which way the addition occurs, two isomers can be formed. While we are not positive which way addition takes place, the examples below indicate the mode of addition to the best of our knowledge and belief, and the compounds are so named. However, we do not wish to be bound by our theory in this matter. This process is illustrated by the following examples.

Example I

*O,O-diethyl-S-(1-phenyl-2-nitroethyl) phosphorodithionate.*—In a reactor equipped with an agitator, liquid feed means, and reflux condenser were placed 15.9 parts of β-nitrostyrene and 117 parts of 95 percent ethanol. Then 18.4 parts of diethyl dithiophosphoric acid was added slowly. The temperature rose slowly to 42° C. After standing for 1 hour, 0.5 part of elemental sulfur separated and was removed by filtration. The solvent was removed under reduced pressure and the product stripped at 60° C./0.9 mm. to give 32.2 parts (96 percent) of O,O-dialkyl-S-(1-phenyl-2-nitroethyl) phosphorodithionate as an oil. *Analysis.*—Calculated for $C_{12}H_{18}NO_4PS_2$: P, 9.23 percent. Found: P, 9.22 percent.

Example II

*O,O-diethyl-1-S-(3,4-dimethoxyphenyl)-2-nitroethyl dithiophosphate.*—In a reactor equipped with an agitator, liquid feed means, and reflux condenser were placed 15.7 parts of 3,4-dimethoxy-β-nitrostyrene and 117 parts of ethanol. Then 13.8 parts of diethyl dithiophosphoric acid was added slowly with stirring at such a rate as to maintain the temperature below 40° C. The slurry was heated at 50–60° C. for six hours and refluxed for 1 hour. After standing overnight the mixture was filtered to give 8.7 parts of unreacted 3,4-dimethoxy-β-nitrostyrene. The filtrate was washed with dilute sodium bicarbonate solution and dried over Drierite. Stripping at 30° C./0.5 mm. gave 10.0 parts (68 percent) of O,O-diethyl-1-S-(3,4-dimethoxyphenyl)-2-nitroethyl dithiophosphate as a viscous orange oil. *Analysis.*—Calculated for $C_{14}H_{22}NO_6PS_2$: P, 8.83 percent. Found: P, 8.42 percent.

Example III

*O,O-diethyl-1-S-(1-phenyl-2-nitropropyl) dithiophosphate.*—In a reactor equipped with an agitator, liquid feed means, and reflux condenser were placed 78 parts of ethanol and 16.3 parts of 1-phenyl-2-nitropropene. Then 18.4 parts of diethyl dithiophosphoric acid was added slowly with stirring. After standing for two days the solution was refluxed for 30 minutes and the solvent removed under reduced pressure. The residue was filtered to give 6.3 parts of unreacted 1-phenyl-2-nitropropene and the filtrate washed well with dilute sodium bicarbonate solution. The oil was dried over Drierite and stripped under vacuum to yield 16.6 parts (78 percent) of O,O-diethyl-1-S-(1-phenyl-2-nitropropyl) dithiophosphate as a dark orange oil. *Analysis.*—Calculated for $C_{13}H_{20}NO_4PS_2$: P, 9.19 percent. Found: P, 9.41 percent.

Example IV

*O,O-diethyl-S-2-nitropropyl dithiophosphate.*—In a reactor equipped with a reflux condenser, temperature measuring device, and liquid feed means were placed 6.7 parts of 2-nitropropene and 78 parts of ethanol. Then 18.6 parts of diethyl dithiophosphoric acid was added with cooling to keep the temperature below 30° C. The solution was allowed to stand overnight, and the alcohol was removed under reduced pressure. The residue was stripped at 30° C./0.9 mm. to yield 24.8 parts (98 percent) of O,O-diethyl-S-2-nitropropyl dithiophosphate as a viscous orange oil.

Example V

*O,O-diethyl-S-2-(1,1,1-trichloro-3-nitropropyl) dithiophosphate.*—In a reactor equipped with temperature measuring device and liquid feed means were placed 19.0 parts of 1,1,1-trichloro-3-nitropropene. An addition of 18.4 parts of diethyl dithiophosphoric acid was made slowly, keeping the temperature below 50° C. After standing at room temperature overnight, the product was stripped at 60° C./1 mm. to yield 33.0 parts of O,O-diethyl-S-2-(1,1,1-trichloro-3-nitropropyl) dithiophosphate (88.4 percent).

Example VI

*O,O-diethyl-S-1-(2-nitrobutyl) dithiophosphate.*—In a reactor equipped with an agitator, liquid feed means, reflux condenser, and temperature measuring device were placed 18.4 parts of diethyl dithiophosphoric acid in 32 parts of absolute ethanol. An addition of 10.1 parts of 2-nitrobutene-1 was made slowly, keeping the temperature below 35° C. After standing 3 days at room temperature the product was stripped at 30° C./6 mm. Yield, 27.7 parts (92.3 percent) of O,O-diethyl-S-1-(2-nitrobutyl) dithiophosphate.

The same general methods of these examples are also applicable to other compounds of this invention. Even though all the above examples are for the preparation of diethyl compounds they can be used for the preparation of other dialkyl materials, such as the dimethyl, dipropyl, dioctyl, diamyl, and the like; and furthermore, these compounds containing other alkyl groups fall within the purview of our invention, as their insecticidal activity is high.

For maximum effectiveness the new compounds of the present invention are admixed in insecticidally effective amount with a conditioning agent of the type commonly referred to as a pest control adjuvant or modifier. In order to provide formulations particularly adapted for ready and efficient application to pests using conventional equipment, such formulations comprise those of both the liquid and solid types as well as the "aerosol" type formulations. In the pure state our compounds may be too effective or too potent in some applications to have practical utility as pesticides. For example, in order to protect most effectively a surface such as paint, wood, concrete, etc., it is preferred to apply our materials in intimate contact but thoroughly dispersed on the surface. Likewise, in treating more or less porous material, such as cloth, felted textiles, and woven fibers, it is important that our materials be interspersed between the fine structure of such materials and be in intimate contact therewith. Therefore, in order to benefit from our discovery that the defined materials are effective pesticides, we incorporate therewith a relatively inert surface-active agent or adjuvant as a dispersing medium. Furthermore, such adjuvants have the effect of requiring only minute quantities of the above defined compounds in some formulations to obtain effective protection. A further advantage of so extending these materials is to permit field application by methods readily employed and still obtain effectively complete coverage of the material being protected.

The formulations of this invention, therefore, comprise the hereinabove defined pesticidally active ingredients and a suitable material as an adjuvant or conditioning agent therefor. It is not intended that this invention be limited to any specific proportions of active ingredient and adjuvant. The important feature of the invention is to provide an adjuvant such that upon the preparation of a formulation of such concentration as appropriate for application, the adjuvant will be present to provide the proper type of contact with the material being protected. Thus, in one embodiment the adjuvant can comprise a surface-active agent such as a detergent, a soap, or other wetting agent. Such a formulation then comprises the active ingredients in combination with a minor proportion of the surface-active agent or adjuvant. Such a formulation is of practical merit because of its concentrated form and ease of transportation, storage, and the like. Such a formulation lends itself directly to further dilution with the carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "conditioning agent" include solid carriers of the type of talc, pyrophyllite, Attaclay, Attapulgus type clay, kieselguhr, chalk, diatomaceous earth, and the like; and various mineral powders, such as calcium carbonate and the like, which act as a dispersant, as a carrier, and in some instances perform the function of a surface-active agent.

One method of applying these pesticides is in the form of a water suspension. However, to obtain a pesticidally active aqueous suspension, we employ a surface-active agent in sufficient amount to disperse and suspend the pesticidal agent. Examples of such surface-active agents which can be employed in forming dispersions include salts of the alkyl and alkylaryl sulfonates, such as Du Pont MP–189 and Nacconol–NR, a sodium salt; alkyl sulfates, such as Dreft; alkylamide sulfonates, including fatty methyl taurides such as Igepon-T; the alkylaryl polyether alcohols, such as Triton X–100; the fatty acid esters of polyhydric alcohols, such as Span; the ethylene oxide addition products of such esters, as for example Tween, a hexitol product; and the addition products of long-chain mercaptans and ethylene oxide, such as Sharples' Non-Ionic-218. Still other surface-active agents can be employed, the above merely showing a representative list of the more common materials.

In the examples which follow, all parts are parts by weight.

*Example VII*

A formulation of O,O-di-n-butyl-S-2-nitroethyl dithiophosphate is prepared by adding with vigorous agitation 10 parts of this material to 1000 parts of water containing one part of Tween-80. This concentrated dispersion is further diluted 1000 times by the adidtion of water to obtain a formulation of suitable concentration for application. Thus, the resulting dispersion contains 10 p.p.m. of our pesticide in the water dispersion.

The solubility of the active ingredients of this invention in organic solvents, furthermore, is such that they can be applied advantageously in the form of solution in this type of solvent, and for certain uses this method of application is preferred. For example, in treating cloth, leather, or other fibrous articles, it is preferred to apply the pesticides dissolved in a volatile solvent. After use the volatile solvent evaporates, leaving the pesticidal agents impregnated throughout the surface of the article and in the dispersed form which has been found to be most advantageous. Likewise, in applying the pesticides to smooth surfaces, as, for example, in treating wood or other surfaces, a solution may be the most practical method for applying a protective film by brushing, spraying, or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the pesticides, we use hydrocarbons, such as benzene, xylene, or toluene; ketones, such as acetone, methylethyl ketone, and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which are employed are the Carbitols and Cellosolves, the former comprising in general the monoalkyl ethers of diethylene glycol, and the latter, the monoalkyl ethers of ethylene glycol. In addition, combinations of these various typical solvents can be employed whereby special volatility and viscosity characteristics can be imparted to the formulations.

*Example VIII*

A solution consisting of 5 parts of O,O-dimethyl-S-(1-phenyl-2-nitroethyl) dithiophosphate in 250 parts of cyclohexanone is prepared by stirring the two constituents for a period of 2 minutes at a temperature of about 25°

C. This concentrated solution, suitable for storage or transportation, is further diluted with 99,750 parts of kerosene to form a final dilution of 50 p.p.m. suitable for application.

A preferred formulation of the active ingredient pesticides of this invention comprises a wettable powder. In preparing wettable powders several formulation procedures are possible. Thus, it is one intention of this invention to provide compositions comprising the active ingredients defined herein in combination with a minor amount of a surface-active agent. Such surface-active agent can be chosen, for example, from among the following: alkyl and alkaryl sulfonates, such as Du Pont MP–189 and Nacconol-NR; alkyl sulfates, such as Dreft; alkylamide sulfonates, such as Igepon-T; the alkylaryl polyether alcohols, such as Tritox X–100; the fatty acid esters of polyhydric alchols, such as Span; the ethylene oxide addition products of such esters, as for example Tween; and the addition products of long-chain mercaptans and ethylene oxide, such as Sharples' Non-Ionic-218. Still other surface-active agents can be employed, the above merely showing a representative list of the more common materials. Many of these materials will dissolve in our new compounds, while others form suspensions. Such formulations can be readily admixed with a dust carrier. Formulations thus formed then comprise the active ingredients of this invention, a surface-active agent, and the inert carrier. Among the inert carriers which can be employed in thus preparing wettable powders are, for example, soybean flour, tobacco flour, walnut shell flour, wood flour, sulfur, tripoli, diatomite (diotomaceous earth) calcium lime, magnesium lime, calcite, dolamite, gypsum, mica, talc, pyrophyllite, montmorillonite, kaolinite, attapulgite, apatite, and pumice. In preparing such concentrated wettable powders it is preferred to employ between about 0.1 and 5 percent of the surface-active agent based upon the amount of active ingredient, and up to 85 percent of the inert carrier based upon the total amount of the formulation. Such formulations provide the advantage of permitting storage and transportation of the pesticides and permit further dilution by simple admixture with water at the time of application. Thus, within the scope of this invention is also contemplated finished formulations for direct application comprising the pesticides as defined herein, surface-active agents as illustrated above, and inert solid carriers as likewise illustrated above, all suspended in water. Such finished formulations, depending upon the application in mind, can include between about 0.1 to 10,000 p.p.m. of active ingredient. A preferred range for agricultural application is between 0.1 and 2,000 p.p.m. Typical formulations of such wettable powders of this invention are illustrated in the following examples, wherein the active ingredients of this invention are employed as the pesticides.

*Example IX*

A mixture of 100 parts of O,O-diethyl-S-1-(2-nitrohexyl) dithiophosphate, 1000 parts of Attaclay (Attapulgus type clay), and 0.1 part of Nacconol (sodium salt of an alkyl aryl sulfonate) is intimately mixed in an L-shaped blender. The 10 percent wettable powder thus prepared produces a satisfactory water suspension when 11 parts are stirred into 10,000 parts of water to produce a suspension containing 100 p.p.m. active ingredient.

In addition to the above described methods of wet application of the active ingredients of this invention, compositions can be prepared in which the materials are extended in talc, clay, or other solid diluents. Such carriers perform the conditioning agent function as contact agents. Further specific examples of such typical inert solid carriers which can be employed as diluents in the dust formulations include fuller's earth, pyrophyllite, Attaclay (Attapulgus type clay), and the Filtrols (acid activated montmorillonite).

*Example X*

A dust formulation of the pesticides is prepared as follows: One part of O,O-dioctyl-S-2-(3-nitropropyl) dithiophosphate is placed in a ball mill with 100 parts of fuller's earth. This mixture is milled for a period of one hour and screened to collect a fraction passing a 100-mesh sieve. This 1 percent by weight formulation can be applied directly or further diluted. A further dilution is made by repeating the above procedure with an additional 9,900 parts of fuller's earth.

For certain applications it is preferred to employ the pesticides in the form of oil-in-water emulsions. Thus, a concentrate of the pesticidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

*Example XI*

An oil-in-water emulsion is prepared by dissolving 10 parts of O,O-diethyl-S-(1-phenyl-2-nitroethyl) dithiophosphate in 1000 parts of kerosene. This solution is dispersed with vigorous agitation in 99,000 parts of water containing 1 part of Triton X–100 to provide a dispersion containing 10 p.p.m. of active agent.

In addition, we have found that we can incorporate an adherent or sticking agent, such as vegetable oils, naturally occurring gums, and other adhesives, in our active ingredient formulations. Likewise, we can employ humectants in our formulations. Furthermore, these formulations can be employed in admixture with other pesticidal materials or other biocides, such as insecticides, larvicides, bactericides, vermicides, miticides, or with other materials which it is desired to apply along with our pesticides.

Our compounds also find effective use when formulated in "aerosol" type formulations; that is, when mixed with a liquid of low boiling point that changes to a gas when released from a confined space. Examples of this type diluent are fluorinated hydrocarbons such as tetrafluoromethane and hexafluoroethane; mixed halogenated compounds containing fluorine and chlorine, such as difluorodichloromethane, pentafluorochloroethane; or ethylene substituted with both these halogens. Compounds containing fluorine and bromine are also applicable, as, for example, trifluorobromomethane. Other materials such as carbon dioxide, sulfur dioxide, hydrogen sulfide, and ammonia can be used, and of these carbon dioxide is preferred. One method of preparing such "aerosol" formulations comprises introducing our new compounds into a pressure cylinder and later introducing the liquefied diluent under pressure, followed by mixing the cylinder to obtain uniform solution. If desired, smaller containers can then be filled from the cylinder in which the formulation is made up. In many cases it is desirable to add a second solvent to the low boiling material of the type described above, so as to more readily dissolve our compounds. Examples of such cosolvents are benzene, acetone, carbon tetrachloride, butyl acetate, Cellosolve, and the like.

*Example XII*

Into a cylinder rated at 500 p.s.i. working pressure, is introduced 10 parts of O,O-diethyl-S-1-(3,4-dimethoxyphenyl)-2-nitroethyl dithiophosphate. The cylinder is then made pressure-tight except for one opening, through which is introduced a mixture of 50 parts acetone and 50 parts dichlorodifluoromethane from a container at 2000 p.s.i. The cylinder into which the ingredients are introduced is then sealed off and inverted to give a uniform "aerosol" solution of our active materials in the mixture of co-solvents.

The insecticidal activity of our compounds can be illustrated by their behavior in the following tests.

*Spider mite.*—Adult two-spotted spider mites, *Tetranychi bimaculati*, are transferred to uninfested Tendergreen bean plants the day prior to testing. The insecticide formulations are sprayed onto the infested plants, and counts are made after one day to determine the immediate effects of the chemical on mites and again after 3 to 7 days to determine ovicidal effectiveness. G-338 (2-hydroxy-2,2-bis[4-chlorophenyl]ethyl acetate) is commonly used as a reference material.

*Bean bettle.*—Fourth instar larvae of the Mexican bean bettle, *Epilachna varivestis*, is the test species. Paired seed leaves from Tendergreen bean plants which have been wetted with the test formulation and then dried are separated and each placed in a Petri dish with a filter paper liner. Ten larvae are placed into each of the Petri dishes. Following three days' exposure, the percent inhibition of feeding and the percent kill is recorded. Dilan, a mixture of 1,1-bis(p-chlorophenyl)-2-nitrobutane and 1,1-bis(p-chlorophenyl)-2-nitropropane, Lindane gamma isomer of benzene hexachloride, Parathion O,O-diethyl O-p-nitrophenyl thiophosphate, TEPP tetraethylpyrophosphate, and Toxaphene octachlorocamphene are reference insecticides.

*Roach.*—Male German cockroaches, *Blatellae germanicae*, are anaesthetized and dipped in the insecticide formulation. After 10 to 15 seconds immersion they are freed of excess liquid and caged. Mortality counts are taken after one and three days' exposures. Lindane, DDT, Chlordane, Parathion, TEPP, pyrethrum, and Toxaphene are reference insecticides.

*Bean aphid.*—Nasturtium leaves infested with 25 to 100 bean aphids, *Aphis fabae*, are dipped in the test formulation. No attempt is made to select insects of a given age in this test. The leaves are caged separately, and percent kill is recordetd after 24 hours' exposure. Parathion, Lindane, and TEPP are screened as reference materials.

*House fly.*—Twenty-five unsexed house flies four to five days old are caged under a bowl of a screen strainer five inches in diameter and three inches high with bait prepared as follows: An aqueous dispersion is diluted with a sugar solution to give the desired toxicant level and a 10 percent concentration of sugar. Fifteen ml. is poured onto a piece of cellucotton in a small paper cup. Mortality counts are made after a 24-hour exposure.

*Mosquito.*—The test formulation is added to a beaker containing 25 fourth instar larvae of the yellow fever mosquito, *Aedes aegypti*. Lindane, DDT, Chlordane, TEPP, pyrethrum, and Toxaphene are reference materials.

The behavior of typical compounds against these insects is shown in the following table, wherein the $LD_{50}$ in p.p.m. against various insects is recorded.

| Dithiophosphate | $LD_{50}$, p.p.m. Against— | | | | | |
|---|---|---|---|---|---|---|
| | Spider Mite | Bean Beetle | Roach | Bean Aphid | House Fly | Mosquito |
| O,O - diethyl - S - 1 - phenyl-2-nitroethyl | 3 | 50 | 50 | 10 | 32 | 0.1 |
| O,O-diethyl-S-1-(3,4-dimethoxyphenyl)-2-nitroethyl | 5 | 60 | 175 | 100 | 50 | 0.5 |

Furthermore, some of our compounds even exert fungicidal activity. For example, in the following tests O,O - diethyl - S - 2 - (1,1,1 - trichloro - 3 - nitropropyl) dithiophosphate and O,O - diethyl - S - 1 - (1 - phenyl-2-nitropropyl) dithiophosphate both had a rating equal to or better than AA against both *Alternaria oleracea* and *Sclerotinia fructicola*.

*Slide germination test.*—By the slide germination test the concentration of test chemical required to inhibit germination of spores from 7- to 10-day old cultures of *Alternaria oleracea* and *Sclerotinia fructicola* is determined. Concentrations of test chemicals used in the primary screen are 1000, 100, 10, and 1.0 p.p.m. The specified concentrations of test chemical are prepared in aqueous suspensions by a series of test tube dilutions. Following the initial dilutions, four volumes of test suspension are diluted with one volume of spore stimulant and spore suspension. The spore stimulant is added to insure a high and relatively stable percentage of germination in the checks. Drops of the test suspension mixture, and an untreated control are pipetted onto glass slides. The glass slides are placed in moist chambers for 20 hours' incubation at 22° C. Germination counts are made by counting 100 potentially viable spores, those spores that would germinate under the normal conditions of the control. The percent germination is expressed by the following equation: observed percent germination × 100 ÷ percent germination in the control. Test compounds are given letter ratings which correspond to the concentration that inhibits germination of half of the spores ($ED_{50}$): AA=0.1 to 1.0 p.p.m.; A=1.0 to 10 p.p.m.; B=10 to 100 p.p.m.; C=100 to 1000 p.p.m.; and D=>1000 p.p.m. The glass slide germination test by the test tube dilution method is adapted from a procedure recommended by the American Phytopathological Society's committee on standardization of fungicidal tests (Phytopathology 37, 354–356 (1947)).

We claim:

1. Compounds having the formula

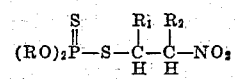

wherein R is a saturated lower alkyl group, $R_1$ is selected from the group consisting of hydrogen, phenyl, 3,4-dimethoxy phenyl and trichloromethyl and $R_2$ is selected from the group consisting of hydrogen and lower alkyl.

2. Compounds according to claim 1 wherein R is ethyl.

3. O,O-dilower alkyl-S-(1-phenyl-2-nitro) lower alkyl dithiophosphate.

4. O,O-diethyl-S-(1-phenyl-2-nitro) ethyl dithiophosphate.

5. O,O-diethyl-S-(1-phenyl-2-nitro) propyl dithiophosphate.

6. An insecticidal composition comprising a surface active agent and a compound of claim 1.

7. An insecticidal composition comprising a surface active agent and a compound of claim 4.

8. An insecticidal composition comprising a surface active agent and a compound of claim 5.

9. Method of combating insects comprising treating the habitat of the insects with a compound according to claim 1.

10. A method of combating insects comprising treating the habitat of the insects with the compound of claim 4.

11. A method of combating insects comprising treating the habitat of the insects with the compound of claim 5.

References Cited in the file of this patent

UNITED STATES PATENTS

| 2,177,757 | Vanderbilt | Oct. 31, 1939 |
| 2,526,179 | West | Oct. 17, 1950 |
| 2,609,383 | Craig | Sept. 2, 1952 |
| 2,724,719 | Markley et al. | Nov. 22, 1955 |
| 2,789,124 | Gilbert et al. | Apr. 16, 1957 |
| 2,802,856 | Norman et al. | Aug. 13, 1957 |

(Other references on following page)

FOREIGN PATENTS

| | | |
|---|---|---|
| 969,440 | France | Dec. 20, 1950 |
| 257,649 | Switzerland | May 2, 1949 |

OTHER REFERENCES

Frear: "Chemistry of Insecticides and Fungicides," D. Van Nostrand Co., Inc., New York (1948), pages 277–292.

Norman et al.: "J. Am. Chem. Soc.," 74, 161–163 (1952).

Mel'Nikov et al.: "Doklady Akad. Nauk S.S.S.R.," 86, 543–6 (1952) (see also "Chem. Abst.," 48, 556–7 (1954)).

Chem. Abst., vol. 47, 1953, page 5877g and h.

Gar et al.: "Doklady Akad. Nauk S.S.S.R.," 94, 241–4 (1954) (see also Chem. Abst., 48, 6639–40 (1940)).